United States Patent [19]

Sugiura et al.

[11] Patent Number: 4,852,891
[45] Date of Patent: Aug. 1, 1989

[54] PLASTIC BOOTS AND METHOD OF MANUFACTURING THE SAME

[75] Inventors: Hidemi Sugiura, Takahama; Mikio Ukai, Nagoya; Kenji Miyamoto, Inazawa, all of Japan

[73] Assignee: Toyoda Gosei Co., Ltd., Nishikasugai, Japan

[21] Appl. No.: 91,353

[22] Filed: Aug. 31, 1987

Related U.S. Application Data

[63] Continuation-in-part of Ser. No. 816,633, Jan. 6, 1986, abandoned.

[30] Foreign Application Priority Data

Jan. 10, 1985 [JP] Japan .................................. 60-2415
Jan. 17, 1985 [JP] Japan .................................. 60-6320

[51] Int. Cl.⁴ .................. F16J 15/52; B29C 49/04; B29C 49/06; F16D 3/84
[52] U.S. Cl. .................. 277/212 FB; 277/212 FB; 264/177.1; 264/506; 264/523; 264/531; 264/538; 264/541; 264/542; 425/438; 425/533; 425/DIG. 58; 464/175
[58] Field of Search .................. 277/212 FB, 208; 464/175; 264/533, 537, 538, 535, 506, 334, 144, 523, 177.1, 541, 542; 425/DIG. 58, 577, 438, 533

[56] References Cited

U.S. PATENT DOCUMENTS

| | | | |
|---|---|---|---|
| 3,028,290 | 4/1962 | Roberts et al. | 264/506 |
| 3,137,748 | 6/1964 | Makowski | 264/537 |
| 3,144,256 | 8/1964 | Wright | 277/208 |
| 3,306,634 | 2/1967 | Groves et al. | 464/175 X |
| 3,597,517 | 8/1971 | Smith | 264/506 |
| 3,830,083 | 8/1974 | Hadick et al. | 277/212 FB X |
| 4,083,202 | 4/1978 | Westercamp | 464/175 X |
| 4,115,496 | 9/1978 | Krall | 264/533 |
| 4,224,808 | 9/1980 | Gehrke | 277/208 X |
| 4,334,852 | 6/1982 | Haubert | 264/533 X |
| 4,353,522 | 10/1982 | Anger | 425/DIG. 58 |
| 4,423,526 | 1/1984 | Izzi, Sr. | 277/208 X |
| 4,475,845 | 10/1984 | Odill et al. | 277/212 FB X |
| 4,493,676 | 1/1985 | Krudt | 464/175 |
| 4,515,842 | 5/1985 | Kovacs | 264/533 X |
| 4,549,830 | 10/1985 | Mette | 277/212 FB X |
| 4,558,869 | 12/1985 | Grove et al. | 277/212 FB X |
| 4,559,025 | 12/1985 | Dore | 464/175 |
| 4,565,381 | 1/1986 | Joelson | 277/208 X |
| 4,575,331 | 3/1986 | Dundas | 425/577 |

FOREIGN PATENT DOCUMENTS

| | | | |
|---|---|---|---|
| 61320 | 9/1982 | European Pat. Off. | 464/175 |
| 1525900 | 10/1966 | Fed. Rep. of Germany | |
| 3140514 | 10/1981 | Fed. Rep. of Germany | |
| 8132242 | 11/1981 | Fed. Rep. of Germany | |
| 2414144 | 9/1979 | France | 464/175 |
| 1154168 | 6/1969 | United Kingdom | 277/212 FB |

*Primary Examiner*—Allan N. Shoap
*Attorney, Agent, or Firm*—Cushman, Darby & Cushman

[57] ABSTRACT

Plastic dust-proof boots which are made of thermoplastic resin by means of blow molding and provided at least on one end of a bellows with a stationary ring to be fitted to an engaging groove formed on an attaching shaft and methods for manufacturing the plastic boots. In the boots, an inner circumference base upright wall of the stationary ring is formed at a nearly vertical state, and the inner circumference base upright wall of the stationary ring is connected through a sleeve having an inner diameter so that the attaching shaft can be loosely fitted. In manufacturing the boots, the stationary ring and the sleeve are molded during the parison molding previously or during mold tightening at the blow molding stage, and the blow molding is performed while the stationary ring and the sleeve are grasped between molds. Accordingly, the base upright wall of the stationary ring is securely locked to the engaging groove, and the boots having the base upright wall of such shaft form can be easily molded in the blow molding process.

2 Claims, 5 Drawing Sheets

PLASTIC BOOTS AND METHOD OF MANUFACTURING THE SAME

This is a continuation-in-part of application Ser. No. 816,633, filed Jan. 6, 1986 which was abandoned upon the filing hereof.

BACKGROUND OF THE INVENTION

The present invention relates to plastic dust-proof boots, wherein the boots are made of thermoplastic resin by means of blow molding and provided at least on one end of a bellows with a stationary ring to be fitted to an engaging groove formed on an attaching shaft. The boots are favorable particularly when the stationary ring is at the smaller diameter side.

The dust-proof boot may be used as dust covers for ball joints, steering rack boots to be used for automobiles, constantspeed joint boots and the like.

An example of a rack boot as shown in FIG. 1 will now be described. Such boots have been usually made of rubber such as chloroprene rubber (CR). However, from the viewpoint of molding workability and improvement of cold resistance mainly, molding of thermoplastic resin is studied and partly being used in practice. Such boots are manufactured by means of blow molding (particularly injection blow molding).

When boots are manufactured by means of blow molding, the stationary ring is pulled towards the bellows during the blow molding of the stationary ring at the side which connects to the bellows. Consequently, it is difficult to form the inner circumference base upright wall of the stationary ring in the boot at a nearly vertical state, i.e., sharply. Particularly, in the stationary ring at smaller diameter side, this tendency is significant on account of the small size. If the inner circumference base upright wall 2 of the stationary ring 1 is not formed sharply as shown in FIG. 2, when the stationary ring 1 is fitted to the engaging groove 5 of the attaching shaft 3, the locking action of the engaging groove 3 to the locking wall 5a is small and therefore the stationary ring 1 is apt to be pulled away. In order to prevent the stationary ring 1 from being pulled away, a rubber grommet 7 with a pullingproof flange 7a is interposed as shown in FIG. 3. However, sufficient pulling-proof property is not obtained in this method. Moreover, since the rubber grommet is used, the number of process steps which are needed for assembling the equipment as a whole is increased and snap action to enable easy confirmation of fitting to the engaging groove cannot be obtained.

SUMMARY OF THE INVENTION

The invention consists in plastic dust-proof boots wherein a stationary ring to be fitted to an engaging groove formed on an attaching shaft is provided at least on one end of a bellows, an inner circumference base upright wall of the stationary ring is formed at a nearly vertical state, and the inner circumference base upright wall of the stationary ring and the bellows are connected through a sleeve having an inner diameter to enable loose fitting to the attaching shaft. By preference the stationary ring and the sleeve are molded during parison molding previously or during mold tightening at blow molding, and the blow molding is performed while the stationary ring and the sleeve are grasped between molds.

According to above-mentioned construction, the invention has effects as follows:

(a) Since the base upright wall of the stationary ring is formed at a nearly vertical state, the stationary ring is securely locked to one end of the engaging groove. Consequently, the stationary ring need not be attached through a rubber grommet with a pulling-proof flange although required in the prior art. Thus the number of process steps required for mounting the boots can be decreased, a fitting sense by snap action is obtained, and fitting of the stationary ring to the engaging groove is easily confirmed.

(b) Since the inner circumference base upright wall of the stationary ring is connected to the bellows through the sleeve, movement of the bellows during rocking of the joint shaft is not directly transmitted to the stationary ring, but the stationary ring is fixed to the engaging groove securely and also the sealing property is improved.

(c) Since the blow molding is performed while the stationary ring and the sleeve are held by the mold, the stationary ring is scarcely subjected to the tensile action of the bellows, but the inner circumference base upright wall of the stationary ring can be easily maintained at shaft form.

DESCRIPTION OF THE PREFERRED EMBODIMENTS

Figure 4:
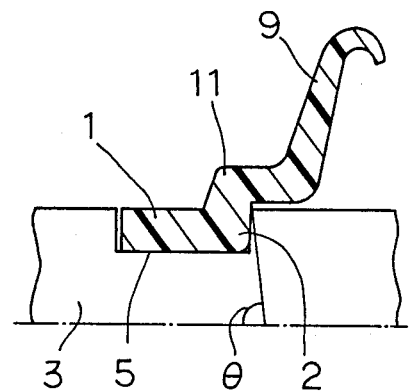
FIG. 4 is a partly sectional view of a main part illustrating the attaching state of a boot of an embodiment of the invention.

FIG. 4 shows an embodiment of the invention. In FIG. 4, a stationary ring 1 at smaller diameter side of a rack boot has an inner circumference base portion formed sharply. The stationary ring 1 and a bellows 9 are connected through a sleeve 11 having an inner diameter to which an attaching shaft (joint shaft) 3 can be loosely fitted. In similar manner to the prior art, the inner diameter of the stationary ring 1 is made equal to or slightly smaller than axial diameter of an engaging groove 5 of the joint shaft 3 so that the stationary ring 1 is closely contacted with a circumferential surface of the engaging groove 5. The length of the stationary ring 1 is made slightly smaller than the width of the engaging groove 5 of the joint shaft 3 so that the stationary ring 1 can be loosely fitted to the engaging groove 5. An inner circumference upright wall 2 at the base portion of the stationary ring 1 is formed at a nearly vertical state. The nearly vertical state means the state in which the angle $\theta$ in FIG. 4 is 70°–110° (90°+20°).

Figure 5:
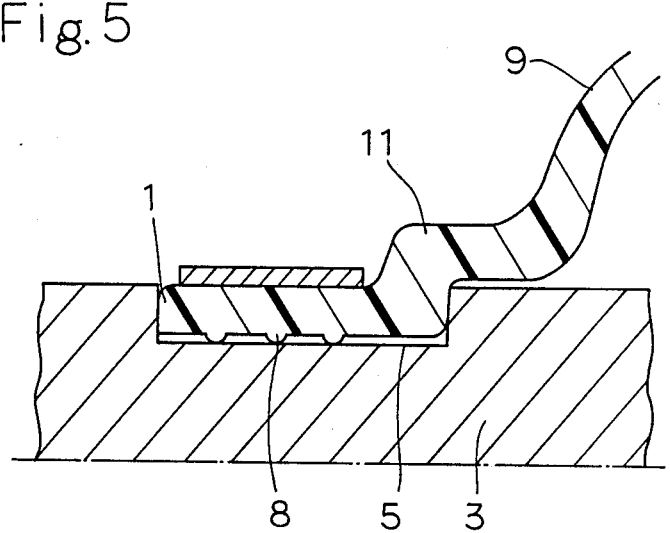
FIG. 5 is a partly sectional view of the main part illustrating the attaching state of a boot as another embodiment of the invention.

In the above-mentioned boot, a rib 8 may be provided in the circumferential direction of the inner circumferential surface of the stationary ring 1 as shown in FIG. 5 from the viewpoint of following items (a) and (b).

(a) Since the stationary ring 1 and the engaging groove 5 are contacted at multiple stages and in nearly line contact, the sealing property is improved.

(b) Since the contact surface is decreased the contact resistance is decreased in comparison to the boot without the rib 8, even if the joint shaft 3 is rotated during alignment adjusting of the wheels, sliding in the circumferential direction of the stationary ring 1 to the engaging groove 5 becomes easy and therefore the boot itself is not twisted.

Figure 6:
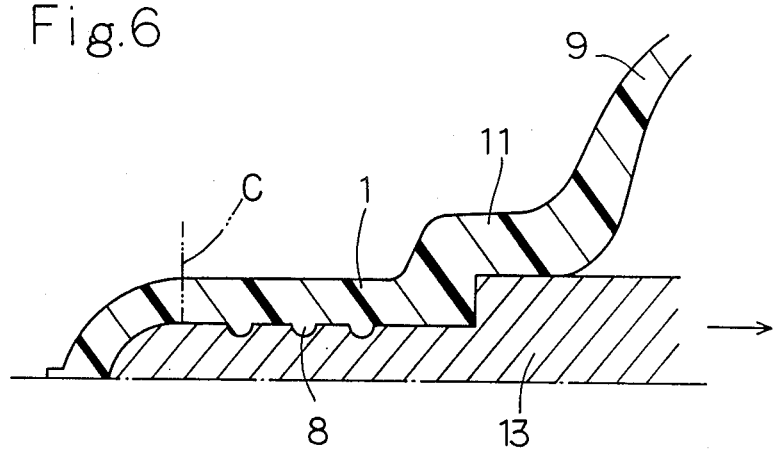
FIG. 6 is a partly sectional view illustrating the relation between a mandrel and a molded article before the molding releasing at blow molding of the boot in FIG. 5.

In order to mold the boot as shown in FIG. 5, since the ribs 8 on the inner circumferential surface of the stationary ring 1 constitute a large undercut to a mandrel as shown in FIG. 6, forcible pulling may be required during the mold releasing, resulting in inferior molding products (dimension defect).

Figure 7:
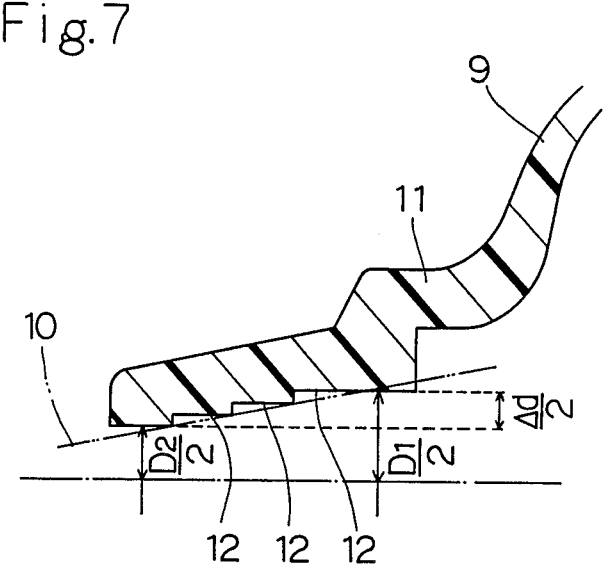
FIG. 7 is a partly sectional view illustrating a ring of a boot of still another embodiment of the invention.

Consequently, as shown in FIG. 7, it is preferable that the inner circumferential surface of the stationary ring 1 is formed as annular or spiral stairs along a circumferential surface of an imaginary truncated cone in tapered form so as to provide the ribs. In the example of FIG. 7, for example, if the maximum inner diameter D1 is made 10–30 mm, difference $\Delta d$ between the maximum inner diameter D, and the minimum inner diameter $D_2$ becomes 0.4–2 mm and each of the four inner diameters decreases towards the outside by $\Delta d/3$ mm. The outer circumferential surface of the ring 1 is formed, for example, in a taper having the same inclinataion as that of the imaginary truncated cone surface 10 drawn by the top end of the stairs formed in the inner circumferential surface.

Figure 8:
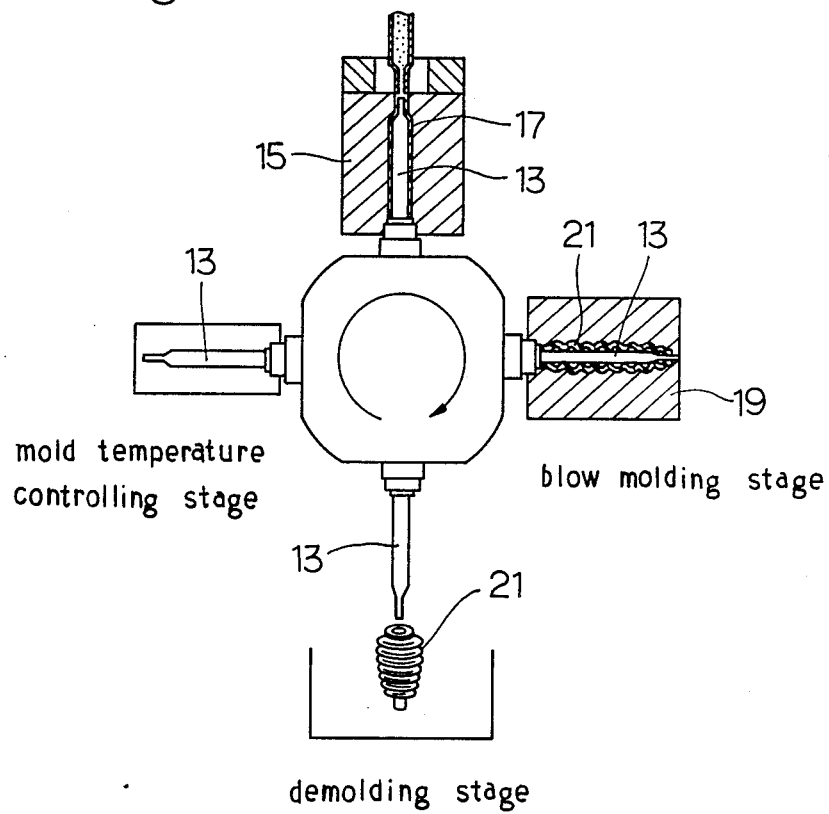
FIG. 8 is a schematic process diagram of injection blow molding.

Next, there will be desribed a process for manufacturing the boot of above-mentioned construction by means of injection blow molding (refer to FIG. 8). The boot can be manufactured also by means of extrusion blow molding.

(1) At the injection stage, a mandrel (core mold) 13 is enclosed by a cavity mold 15, i.e. the mold closing is performed and a bottomed parison 17 is molded by injection. Then as shown in FIG. 9, the stationary ring 1 and the sleeve 11 are molded in the final form, and the upright wall 2 at inner circumference base portion of the stationary ring 1 is formed at a nearly vertical state.

(2) The bottomed parison 17 is supported by the mandrel 13 and transferred to the blow molding stage. The mandrel 13 is enclosed by a blow mold 19, i.e., the mold closing is performed and blow molding is performed.

Figure 9:
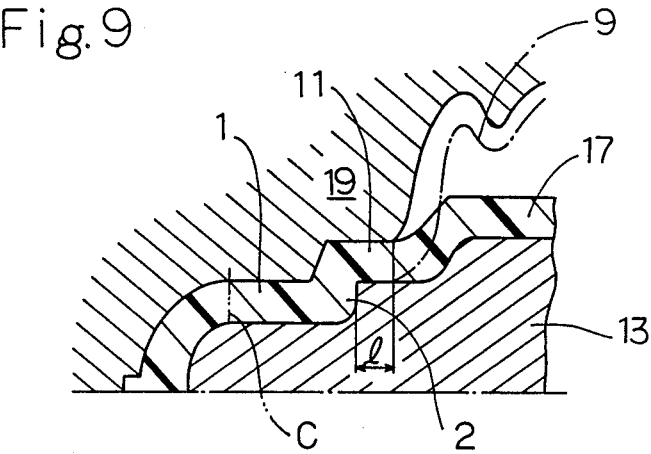
FIG. 9 is a partly sectional view of the main part illustrating molding of the boot in FIG. 4.

Then, in a similar manner to the prior art, as shown in FIG. 9, the bottomed parison is deformed and tensile action is produced in the bellows 9. However, since the sleeve 11 is interposed between the upright wall 2 at inner circumference base portion of the stationary ring 1 and the bellows 9 and moreover the stationary ring 1 and the bellows 9 are grasped (grasping distance 1 not less than 2.5 mm) by the mandrel 13 and the blow mold 19, the inner circumference base upright wall 2 formed sharply of the stationary ring 1 is not deformed.

(3) Subsequently, after opening the mold, the molded article 21 is supported by the mandrel 13 and transferred to a demolding stage and separated from the mold completely by means of air or the like. The molded article 21 is cut at the position shown by dash-and-dot line C in FIG. 9 or FIG. 11 so as to obtain a boot 23.

The boot can be molded also by means of extrusion blow molding. In this case, when the mold is tightened at the blow molding stage, the stationary ring 5 and the sleeve 11 are molded by compression molding.

Figure 1:
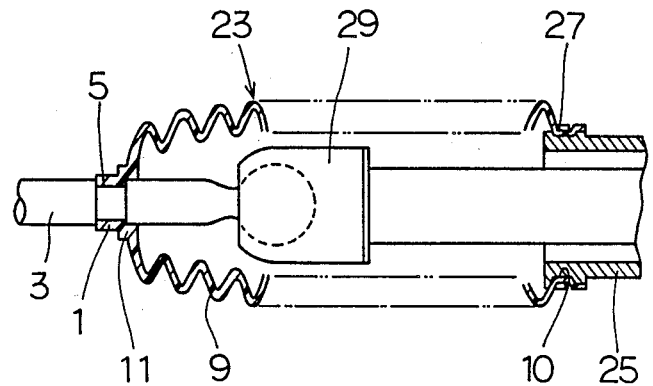
FIG. 1 is a schematic sectional view of a ball joint to which a boot as an embodiment of the invention is attached.
Figure 2:
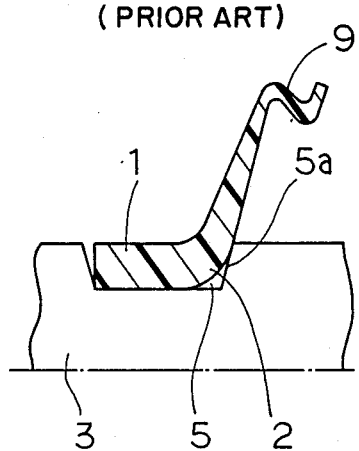
FIG. 2 is a partly sectional view of a main part illustrating the attaching state of a boot in the prior art.
Figure 3:
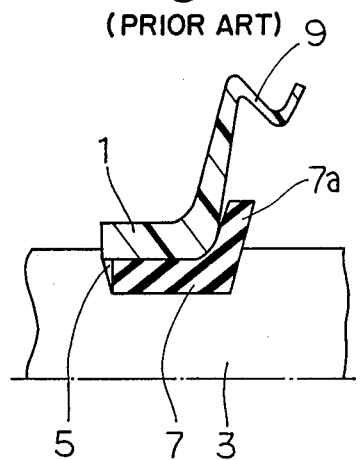
FIG. 3 is a partly sectional view of the main part illustrating the attaching state of the boot when a rubber grommet is interposed at the inner circumference of a stationary ring in FIG. 2.

The mode of use of the boot obtained in above-mentioned construction is as follows:

As shown in FIG. 1, the stationary ring 1 at the smaller diameter side of the boot 23 is fitted to the engaging groove 5 of the joint shaft 3 in a similar manner to the boot of the prior art, andthe stationary ring 10 at the larger diameter side is fitted to the engaging groove at the neck portion of a rack housing 25 and fixed by a clip ring 27. Then the stationary ring 1 at the smaller diameter side is securely locked to the engaging groove 5, because the inner circumference base upright wall 2 is formed at the nearly vertical state. In addition, numeral 29 designates a ball joint.

Figure 10:
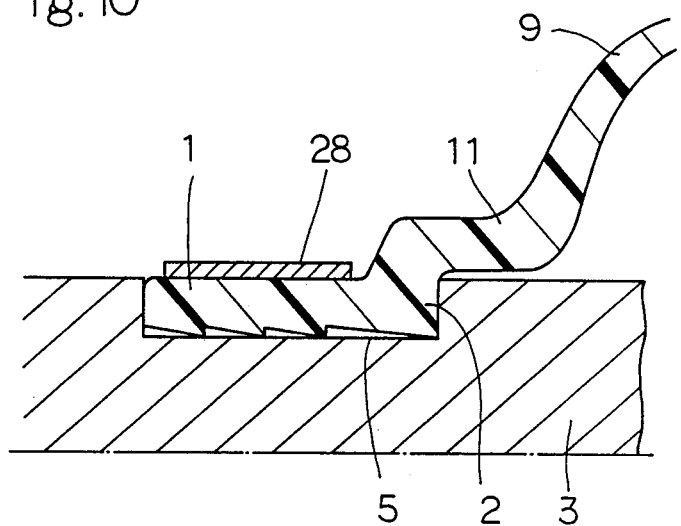
FIG. 10 is a partly sectional view illustrating the attaching state of the boot in FIG. 7.

When the inner circumferential surface of the stationary ring 1 is formed in stairs as shown in FIG. 7, the stationary ring 1 is fitted to the engaging groove 5 of the joint shaft 3 in an enlarged state of diameter at the top end side of the ring 1, and then tightened, for example, by a clamp 28 as shown in FIG. 10.

In this state, the tip portion of the stairs formed at the inner circumferential surface of the ring 1 acts as a rib, thereby the sealing property between the joint shaft 3 and the ring 1 is improved. Even if the joint shaft 3 is rotated during alignment adjusting of the wheels, sliding of the ring 1 in the circumferential direction of the engaging groove 5 becomes easy and the boot itself is not twisted.

Then, as above described, if the value of $\Delta d$ is more than 2 mm, then the ring 1 is fitted to the engaging groove 5, the top end side of the ring 1 is strongly fitted whereas the inner end side thereof is floated, thereby a problem occurs in the fitting property of the ring 1. On the contrary, if value of $\Delta d$ id less than 0.4 mm, when the ring 1 is fitted to the engagng groove 5, the tip portion of the stairs formed at the inner circumferential surface of the ring 1 scarcely acts as a rib as above described.

Figure 11:
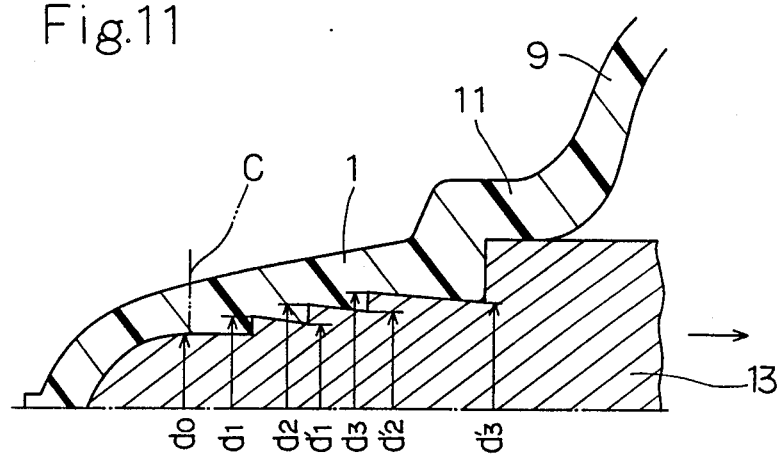
FIG. 11 is a partly sectional view illustrating the relation between the mandrel and the molded article before the mold releasing at blow molding of the boot in FIG. 7.

Although each surface 12 of the stairs is in parallel to the axial line and the undercut to the mandrel is eliminated in the above embodiment, a slight undercut may be provided as shown in FIG. 11 and thereby the value of $\Delta d$ can be decreased.

In this case, however, in order to secure the inside form during the mold releasing, it is preferable that $d_0 < d'_1$, $d_1 < d'_2$, $d_2 < d'_3$.

Figure 12:
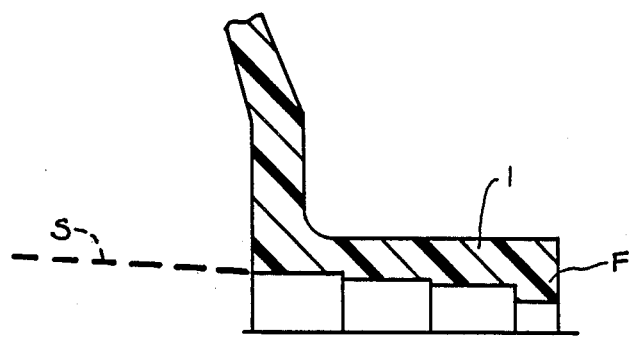
FIG. 12 is a fragmentary longitudinal sectional view of a further embodiment of the boot of the present invention.
Figure 13:
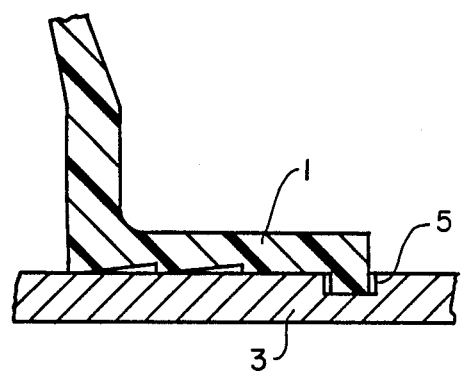
FIG. 13 is a fragmentary longitudinal sectional view of the boot of FIG. 12, as installed on an attaching shaft.

A further embodiment of the boot of the present invention is illustrated in FIGS. 12 and 13. It may be made of the materials and by the method which has been disclosed in regard to the previously described embodiments. In FIG. 12, the rack boot is shown by itself, its stationary ring being illustrated at 1. In FIG. 13, this boot is shown having a radially inwardly directed annular flange at the free end of its stationary ring 1 received in an engaging groove 5 in an attaching shaft (joint shaft) 3. The radially inner wall of the stationary ring 1 is stepped as in the embodiment which has been described hereinabove with regard to FIG. 11.

In FIG. 12, F denotes the annular flange and S indicates the surface of an imaginary truncated cone on which the edges of the steps of the inner surface of the boot are provided.

What is claimed is:

1. A method for providing a dust-proof boot for a protruding equipment shaft which has a cylindrical outer surface portion having a radially outwardly-opening, circumferentially-extending groove provided therein with a bottom wall and opposite flanks which axially-spacedly confront one another, this groove being located intermediate the axial extent of said shaft, said method comprising the steps of:
   (a) molding a parison of thermoplastic material between opposed mold surfaces so as to provide thereon in substantially final form an attachment structure for circumferentially engaging said boot with said surface portion of said shaft and including:
      (i) an axially-elongated annular ring having an axially outer end, a radially inner surface, and an axially inner end;
      (ii) an axially-elongated sleeve having an axially inner end circumferentially joined with an end of a blow-moldable portion of said parison, a radially inner surface, and an axially outer end; and
      (iii) a radially extending annular base wall having a radially inner end circumferentially joined with said axially inner end of said annular ring, an axially inwardly-facing inner surface, and a radially outer end circumferentially joined with said axially outer end of said sleeve;
   said annular ring between said ends thereof being dimensioned to fit between said opposite flanks of said groove with at least portions of said radially inner surface thereof in circumferential engagement with said bottom wall of said groove;
   said radially inner surface of said sleeve being dimensioned to fit loosely about said surface portion of said shaft adjacent a respective flank of said groove; and
   said axially inwardly-facing inner surface of said base wall being sharply discontinuous in direction of extent relative to said radially inner surface of said annular ring at a juncture therewith and extending at an angle which lies within twenty degrees of perpendicular to the longitudinal axis of said boot;
   (b) while confining a respective portion of said parison between said opposed mold surfaces to maintain said annular ring, said axially-elongated sleeve and said radially extending annular base wall in said substantially final form:
      (i) blow molding said blow-moldable portion of said parison to provide an annularly-corrugated tubular bellows having said attachment structure provided at one end thereof; and
   (c) providing at an opposite end of said annularly corrugated tubular bellows another circumferentially extending attachment structure;
   as part of said molding step (a),
      providing said radially inner surface of said annular ring with a plurality of axially-space circumferentially extending ribs,
      providing said radially inner surface of said annular ring so as to be annularly stepped so as to provide said ribs where respective generally radially-directed annular portions thereof meet generally axially-directed annular portions thereof at respective radially inner corners, and
   providing said annular ring to have a shape such that when not stressed by being received in said groove, said annular ring has the respective radially inner corners of said radially inner surface thereof circumferentially arranged on a notional conical surface which enlarges in diameter towards said axially inner end of said annular ring.

2. A plastic dust-proof boot comprising:
   (a) a bellows;
   (b) a stationary ring provided at least on one end of the bellows, said stationary ring having an engaging portion arranged to be fitted to an engaging groove formed externally circumferentially on an attaching shaft;
   said stationary ring having an inner circumferential surface provided with a plurality of circumferentially extending ribs arranged so as to lie axially spaced from one another in a series along a circumferential surface of an imaginary truncated cone, said inner circumferential surface being annularly stepped so as to provide said ribs where respective generally radially directed annular portions thereof meet generally axially directed annular portions thereof at respective radially inner corners to define a series of radial steps, each step having a radially facing top and a radially facing bottom spaced radially outwardly from the respective top.
   and the internal diameter of the bottom of each step being not greater than that of the top of the respective adjoining said step in the direction of tapering of said imaginary truncated cone so as to allow said boot to release easily from a mold used for molding said boot.

* * * * *